US012536271B2

(12) United States Patent
Koshimura et al.

(10) Patent No.: US 12,536,271 B2
(45) Date of Patent: Jan. 27, 2026

(54) DATA TRANSMISSION/RECEPTION CONTROL METHOD AND DATA TRANSMISSION/RECEPTION CONTROL SYSTEM

(71) Applicant: Kunio Koshimura, Kanazawa (JP)

(72) Inventors: Kunio Koshimura, Kanazawa (JP); Sho Koshimura, Kanazawa (JP)

(73) Assignee: Kunio Koshimura, Kanazawa (JP)

( * ) Notice: Subject to any disclaimer, the term of this patent is extended or adjusted under 35 U.S.C. 154(b) by 116 days.

(21) Appl. No.: 18/567,537

(22) PCT Filed: Aug. 30, 2023

(86) PCT No.: PCT/JP2023/031493
§ 371 (c)(1),
(2) Date: Dec. 6, 2023

(87) PCT Pub. No.: WO2024/095587
PCT Pub. Date: May 10, 2024

(65) Prior Publication Data
US 2025/0086267 A1    Mar. 13, 2025

(30) Foreign Application Priority Data
Oct. 31, 2022   (JP) ................. 2022-175135

(51) Int. Cl.
*G06F 21/52*   (2013.01)
*G06F 21/31*   (2013.01)
(Continued)

(52) U.S. Cl.
CPC .............. *G06F 21/52* (2013.01); *G06F 21/31* (2013.01); *G06F 2221/033* (2013.01)

(58) Field of Classification Search
CPC ..... G06F 21/52; G06F 21/31; G06F 2221/033
(Continued)

(56) References Cited

U.S. PATENT DOCUMENTS 12,316,610 B1 *   5/2025   Muth ................. H04L 63/0435
2015/0242643 A1 *   8/2015   Hankins, Jr. .......... H04L 63/08
726/26

(Continued)

FOREIGN PATENT DOCUMENTS

JP           6328867 B1      5/2018
JP        2019-105913 A      6/2019
JP           7107979 B2 *    7/2022

OTHER PUBLICATIONS

Soichiro Shohata; Hardware for Accelerating Anonymization Transparent to Network; IEEE:2018; pp. 181-187.*

*Primary Examiner* — Monjur Rahim
(74) *Attorney, Agent, or Firm* — HAUPTMAN HAM, LLP

(57) ABSTRACT

An electronic data transmission/reception control method and an electronic data transmission/reception control system are provided, which can improve reliability and confidentiality of electronic data to be transmitted and received.
In the electronic data transmission/reception control method, a terminal in which an employee app is installed executes: a document number assignment step; an encryption step; a transmission request step; and a browsing step. A computer in which an organization app O is installed executes an identity verification step and a transmission approval step when an employee who belongs to an own organization is a source of the electronic data, or executes an identity verification reply step and a reception approval step when the employee who belongs to the own organization is a destination of the electronic data. A computer in which a service app is installed executes a communication destination specifying step and a relay step.

15 Claims, 6 Drawing Sheets

(51) Int. Cl.
*G06F 21/34* (2013.01)
*H04L 9/40* (2022.01)

(58) Field of Classification Search
USPC .......................................................... 726/22
See application file for complete search history.

(56) References Cited

U.S. PATENT DOCUMENTS

| | | | |
|---|---|---|---|
| 2018/0232526 A1* | 8/2018 | Reid | G06F 21/6218 |
| 2019/0318122 A1* | 10/2019 | Hockey | G06F 21/6245 |
| 2021/0090183 A1* | 3/2021 | Kerr | H04L 61/4552 |
| 2021/0234849 A1* | 7/2021 | Lamb | H04L 63/04 |
| 2021/0256536 A1* | 8/2021 | Abdelsamie | G06Q 30/018 |

* cited by examiner

DATA TRANSMISSION/RECEPTION CONTROL METHOD AND DATA TRANSMISSION/RECEPTION CONTROL SYSTEM

RELATED APPLICATIONS

The present application is National Phase of International Application No. PCT/JP2023/031493 filed Aug. 30, 2023, and claims priority from Japanese Application No. 2022-175135, filed Oct. 31, 2022, the disclosure of which is hereby incorporated by reference herein in its entirety.

TECHNICAL FIELD

The present invention relates to transfer of electronic data between a plurality of organizations. More specifically, the present invention relates to a data transmission/reception control method and an inter-company data transmission/reception control system that do not allow establishment of electronic data transfer between organizations unless the identity of an employee as a source or a destination is verified, or the contents of the electronic data to be transmitted or received is approved.

BACKGROUND ART

A wide variety of conventional techniques related to electronic data transfer have been disclosed. For example, a technique described in Patent Document 1 has been known as a technique dedicated to control of information related to business cards.

The technique described in Patent Document 1 is an information control system that includes a two-factor authentication technique consisting of company authentication and member authentication and utilizes accumulated information related to business cards and company information to control the information related to business cards.

However, due to the characteristics of the information control method according to the technique described in Patent Document 1, it is difficult to acquire the latest information on partner companies and to realize the technique on a global scale (worldwide). Moreover, the following problems (1) to (4) cannot be solved:

(1) There is a possibility that a problem such as information leakage to areas unintended by a company may occur due to the electronic data transfer based solely on the determination of the parties involved.
(2) There is a problem that electronic data intended for browsing only by the recipient may spread to third parties.
(3) There is a problem that the two-factor authentication consisting of the company authentication and the member authentication cannot completely prevent spoofing, and thus a third party which is not involved may misrepresent its identity (enrollment) and fraudulently implement the electronic data transfer.
(4) There is a problem that data transferred in the past by a person who lost his or her identity (enrollment) within a company due to resignation or the like may remain unintentionally on the other party's side.

In addition, Patent Documents 2 and 3 disclose association in advance between general user identification data that identifies general users (for private use) and employee identification data that identifies employees, as well as a link server program, a vendor server program, and a data linkage system used in that case.

PRIOR ART DOCUMENT

Patent Document

Patent Document 1: Japanese Patent Publication No. 6328867
Patent Document 2: Japanese Unexamined Patent Application Publication No. 2019-105913
Patent Document 3: Japanese Patent Publication No. 7107979

SUMMARY OF INVENTION

Technical Problem

There must be no information leakage or the like even in the case of electronic data transmission/reception by general users (for private use), but in the case of transactions between companies, requirements or legal regulations (compliance with laws and regulations) which differ from those in the case of general use are required. As for the legal regulations, companies need to comply with the Commercial Code and the Companies Act, and prohibition of transactions involving conflicts of interests and construction of corporate governance or an internal supervision system is required. It is to be noted that in recent years, it has become possible to exercise voting rights by means of e-mails and announce financial results of a balance sheet on websites.

However, maintaining a high level of security using leading-edge technologies in each of industries such as the construction industry or the software industry causes problems such as extremely expensive costs complicated operations. Moreover, when a problem arises, the question arises as to who is responsible therefor, and companies would bear heavy responsibility. In particular, even if transmission/reception of electronic data is securely performed between companies, it is highly likely that information will be leaked when the subsequent storage and browsing are expanded to a certain range.

Furthermore, with changing work styles such as remote working due to the global spread of COVID-19 infection, some of business decisions which were conventionally made by organizations are shifting to the discretion of employees, which creates situations susceptible to the problems described above.

Hence, an object of the present invention is to provide an electronic data transmission/reception control method and an electronic data transmission/reception control system in which organizations verify an identity of employees as a source and a destination when transmitting/receiving (transferring) electronic data between companies (for business purposes) so that only the electronic data, contents of which have been approved under the responsibility of each of the organizations, is transmitted or received, and the electronic data to be transmitted or received can be browsed only with a dedicated application (hereinafter, an "application" is referred to as an "app") used by the source employee and the destination employee even though the organizations have a business relationship, thereby improving reliability and confidentiality of electronic data to be transmitted and received.

Means for Solving the Problems

In the electronic data transmission/reception control method of the present invention, electronic data is transferred, via a network, from a terminal in which an employee application (which is hereinafter referred to as an app) used by employees who belong to a predetermined organization is installed, through a computer in which an organization app is installed and a computer in which a service app is installed, to a terminal in which an employee app used by employees who belong to another organization is installed. The method is characterized by the followings. The terminal in which the employee app is installed executes, as a source of the electronic data: a document number assignment step for specifying an employee who is a destination to assign a document number unique to the electronic data; an encryption step for encrypting the electronic data to be transmitted using the document number; and a transmission request step for requesting the organization app used by a responsible person of an own organization to transmit the electronic data. On the other hand, the terminal in which the employee app is installed executes, as a destination of the electronic data, a browsing step of decrypting and visualizing the received electronic data. When the employee who belongs to the own organization is a source of the electronic data, the computer in which the organization app is installed executes, upon receipt of a transmission request for the electronic data from the employee app used by the employee: an identity verification step for verifying identity of the destination employee, i.e., whether or not the destination employee is enrolled, via the service app to an organization app for the organization to which the destination employee belongs; and a transmission approval step in which a responsible person of the own organization confirms contents of the electronic data transmitted by the employee to determine whether or not the transmission is allowed. Moreover, the computer in which the organization app is installed executes: an identity verification reply step for replying to the identity verification from another organization via the service app, whether or not the destination employee, is enrolled in the organization based on an employee identification number assigned in advance in the own organization; and a reception approval step for confirming the contents of the electronic data transmitted from the other organization and determining whether or not reception by the employee app used by the destination employee is allowed. The computer in which the service app is installed executes: a communication destination specifying step for extracting recipient information from the information used in assigning the document number and specify a recipient organization; and a relay step for relaying linkage of the organization apps between the organizations.

Here, the term "employer" refers to employers, corporate bodies, the national government, or local governments. The term "employee" refers to corporate executives, national government employees, or local government employees. Therefore, an "organization" refers to not only civil corporations but also public legal corporations and encompasses organizational groups. That is, the usage of terms here complies with the provisions in Article 35 (Employee Invention) of the Patent Act.

An "application (app)" stands for application software, i.e., a dedicated program for a specific purpose developed to operate on the basic software (operating system) of computers such as mainframes, personal computers, tablets, or smartphones or on cloud computing, the program executing the above-mentioned steps independently or in cooperation with other apps and implementing functionality.

In addition, an "organization app" refers to an application to be used by a person in charge of the organization who is authorized to control and supervise operations related to the transmission/reception of the electronic data by the employee app used by the employee belonging to the organization, and can execute the transmission approval step and the reception approval step described above.

"Electronic data" means any kind of electronic data such as text data, document file data, and application software and broadly encompasses, for example, electronic data with electronic signatures for an electronic payment service using electronic money or contracts. (In the present invention, it is assumed that important documents such as transaction contracts between companies is kept confidential.)

The electronic data transmission/reception control method of the present invention is characterized in that, when a transmission request is made on the employee app used by the employee of the own organization, the computer in which the organization app is installed executes:

an identity guarantee step for, in cooperation via the network with the terminal in which the employee app is installed, comparing an employee identification number assigned in advance by the own organization with a MAC address of the terminal used by the employee to verify that the source employee is not a spoofer and guarantee his/her identity;

a temporary browsing step for temporarily decrypting and visualizing the electronic data encrypted by the employee app used by the source employee and making it possible to browse the electronic data in order to approve transmission and reception;

a history management step for recording and managing a transmission history and a reception history when the electronic data is transmitted or received on the basis of a document number created by the employee app used by the source employee of the electronic data; and an identity checking step for making inquiries about the employee identification number assigned in advance by the own organization and the MAC address of the terminal used by the employee to check that the employee is the person in question, when the terminal in which the employee app is installed is linked via the network.

In addition, the electronic data transmission/reception control method of the present invention is characterized in that: when an employee who belongs to an organization has lost eligibility to use service of the employee app due to separation from job or the like, the computer in which the organization app for the organization is installed executes a deletion request step for disabling the employee app for the employee, extracting transmissions carried out by the employee in the past from the transmission history, and requesting the service app to delete the electronic data; upon receipt of the deletion request, the computer in which the service app is installed executes a deletion instruction step for specifying an organization that instructs the deletion and instructing the organization app for the organization to delete the electronic data; upon receipt of the deletion instruction, the computer in which the organization app for the organization is installed executes a deletion order step for specifying the employee who orders the deletion and ordering the deletion; and the terminal in which the employee app subjected to the deletion order is installed executes a deletion step for deleting the electronic data in response to the deletion order next time when linked with the computer in which the organization app is installed.

Moreover, the electronic data transmission/reception control method of the present invention is characterized in that the computer in which the service app is installed executes an approval confirmation and synchronization step in which when transmission/reception of electronic data is carried out assuming that employees of two organizations simultaneously perform the transmission/reception of the electronic data with respect to each other, such as exchange of business cards, the electronic data is transferred to the both organizations only if the organization apps of the both organizations approve the transmission of the electronic data, and the transmission/reception will not be established if either one of the organization apps does not approve.

In the electronic data transmission/reception control system of the present invention, electronic data is transferred, via a network, from a terminal in which an employee app used by employees who belong to a predetermined organization is installed, through a computer in which an organization app is installed and a computer in which a service app is installed, to a terminal in which an employee app used by employees who belong to another organization is installed. The system is characterized by the followings. The terminal in which the employee app is installed implements, as a source of the electronic data: a document number assignment function for specifying an employee who is a destination to assign a document number unique to the electronic data; an encryption function for encrypting the electronic data to be transmitted using the document number; and a transmission request function for requesting the organization app used by a responsible person of an own organization to transmit the electronic data. On the other hand, the terminal in which the employee app is installed implements, as a destination of the electronic data, a browsing function of decrypting and visualizing the received electronic data. When the employee who belongs to the own organization is a source of the electronic data, the computer in which the organization app is installed implements, upon receipt of a transmission request for the electronic data from the employee app used by the employee: an identity verification function for verifying identity of the destination employee, i.e., whether or not the destination employee is enrolled, via the service app to an organization app for the organization to which the destination employee belongs; and a transmission approval function in which a responsible person of the own organization confirms contents of the electronic data transmitted by the employee to determine whether or not the transmission is allowed. Moreover, the computer in which the organization app is installed implements: an identity verification reply function for replying to the identity verification from another organization via the service app, whether or not the destination employee, is enrolled in the organization based on an employee identification number assigned in advance in the own organization; and a reception approval function for confirming the contents of the electronic data transmitted from the other organization and determining whether or not reception by the employee app used by the destination employee is allowed. The computer in which the service app is installed implements: a communication destination specifying function for extracting recipient information from the information used in assigning the document number and specify a recipient organization; and a relay function for relaying linkage of the organization apps between the organizations.

The electronic data transmission/reception control system of the present invention is characterized in that, when a transmission request is made on the employee app used by the employee of the own organization, the computer in which the organization app is installed implements:

an identity guarantee function for, in cooperation via the network with the terminal in which the employee app is installed, comparing an employee identification number assigned in advance by the own organization with a MAC address of the terminal used by the employee to verify that the source employee is not a spoofer and guarantee his/her identity;

a temporary browsing function for temporarily decrypting and visualizing the electronic data encrypted by the employee app used by the source employee and making it possible to browse the electronic data in order to approve transmission and reception;

a history management function for recording and managing a transmission history and a reception history of the electronic data on the basis of a document number created by the employee app used by the source employee of the electronic data; and an identity checking function for making inquiries about the employee identification number assigned in advance by the own organization and the MAC address of the terminal used by the employee to check that the employee is the person in question, when the terminal in which the employee app is installed is linked via the network.

In addition, the electronic data transmission/reception control system of the present invention is characterized in that: when an employee who belongs to an organization has lost eligibility to use service of the employee app due to separation from job or the like, the computer in which the organization app for the organization is installed implements a deletion request function for disabling the employee app for the employee, extracting transmissions carried out by the employee in the past from the transmission history, and requesting the service app to delete the electronic data; upon receipt of the deletion request, the computer in which the service app is installed implements a deletion instruction function for specifying an organization that instructs the deletion and instructing the organization app for the organization to delete the electronic data; upon receipt of the deletion instruction, the computer in which the organization app for the organization is installed implements a deletion order function for specifying the employee who orders the deletion and ordering the deletion; and the terminal in which the employee app subjected to the deletion order is installed implements a deletion function for deleting the electronic data in response to the deletion order next time when linked with the computer in which the organization app is installed.

Moreover, the electronic data transmission/reception control system of the present invention is characterized in that the computer in which the service app is installed implements an approval confirmation and synchronization function in which when transmission/reception of electronic data is carried out assuming that employees of two organizations simultaneously perform the transmission/reception of the electronic data with respect to each other, such as exchange of business cards, the electronic data is transferred to the both organizations only if the organization apps of the both organizations approve the transmission of the electronic data, and the transmission/reception will not be established if either one of the organization apps does not approve.

Advantageous Effect of the Invention

According to the present invention, for transmission/reception of electronic data from an employee as a source to an employee as a destination, a computer in which an organization app for an organization to which the source employee belongs is installed executes a step for or implements a function of verifying identity of the destination employee to an organization app for an organization to which the source employee belongs. Therefore, when the destination employee is a spoofer or when the destination employee has already lost the eligibility of employee due to the separation from job or the like, it is possible to prevent establishment of the transmission/reception of the electronic data.

In addition, according to the present invention, by performing a step or implementing a function in which a responsible person of an organization confirms and approves contents of electronic data to be transmitted or received by a computer in which an organization app is installed, it is possible to confirm the contents of the electronic data under the responsibility of the organization prior to the establishment of the transmission/reception of the electronic data and determine whether or not transmission and reception are allowed.

According to the present invention, there are provided an identity guarantee step and an identity guarantee function in which, when a transmission request is made from the employee app used by the employee of the own organization, an employee identification number assigned in advance by the organization is compared with a MAC address of the terminal used by the employee in cooperation with the employee app via a network, to guarantee the identity of the source employee. Therefore, it is possible to confirm that the source employee is not a spoofer.

As such, reliable transmission/reception of electronic data under the responsibility of companies is realized because the followings are performed: the identity verification of the destination employee; the approval by the responsible person of the organization for the electronic data to be transmitted or received; the identity verification of the source employee; and the identity checking to reliably check that the employee is the person in question in cooperation via the network with the employee app.

Since a document number assigned by the employee app as the source based on information on both of the source and the destination is reversible, the organization app of the present invention can extract the information on both of the source and the destination from the information used when the document number has been assigned. By recording and managing the document number as the transmission history and the reception history, various functions are implemented in a relationship of the employee app and the organization app.

As described above, according to the present invention, an electronic data transmission/reception control method and an electronic data transmission/reception control system can be provided in which organizations verify and guarantee an identity of employees as a source and a destination when transmitting/receiving (transferring) electronic data between companies (for business purposes) so that only the electronic data which has been approved for transmission/reception under the responsibility of each of the organizations is transmitted or received, and the electronic data to be transmitted or received can be browsed via an app only by those who belong to the source and destination organizations and involve the transmission/reception, thereby improving reliability and confidentiality of electronic data to be transmitted and received.

DESCRIPTION OF EMBODIMENTS

A preferred embodiment of the present invention will now be specifically described with reference to figures. This embodiment will be described by setting a "company" as an "organization" that is a main entity that controls transmission/reception of electronic data.

(Basic Configuration of Electronic Data Transmission/Reception Control Method)

Figure 1:
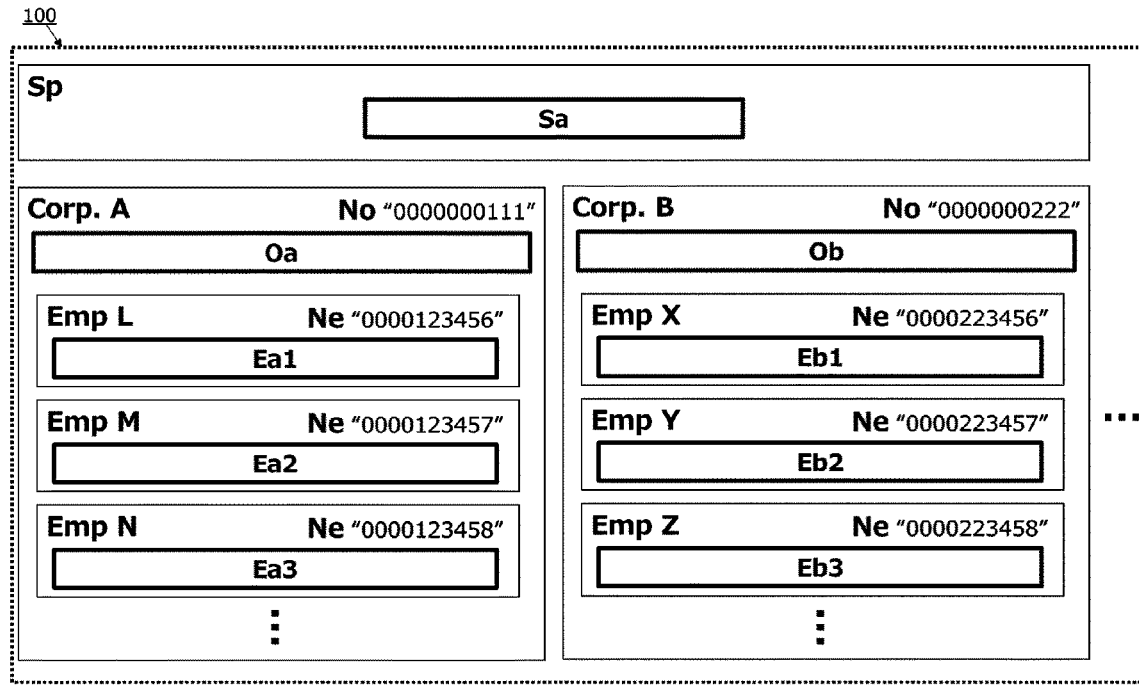
FIG. 1 is a diagram illustrating an overview of an electronic data transmission/reception method according to an embodiment of the present invention.
Figure 2:
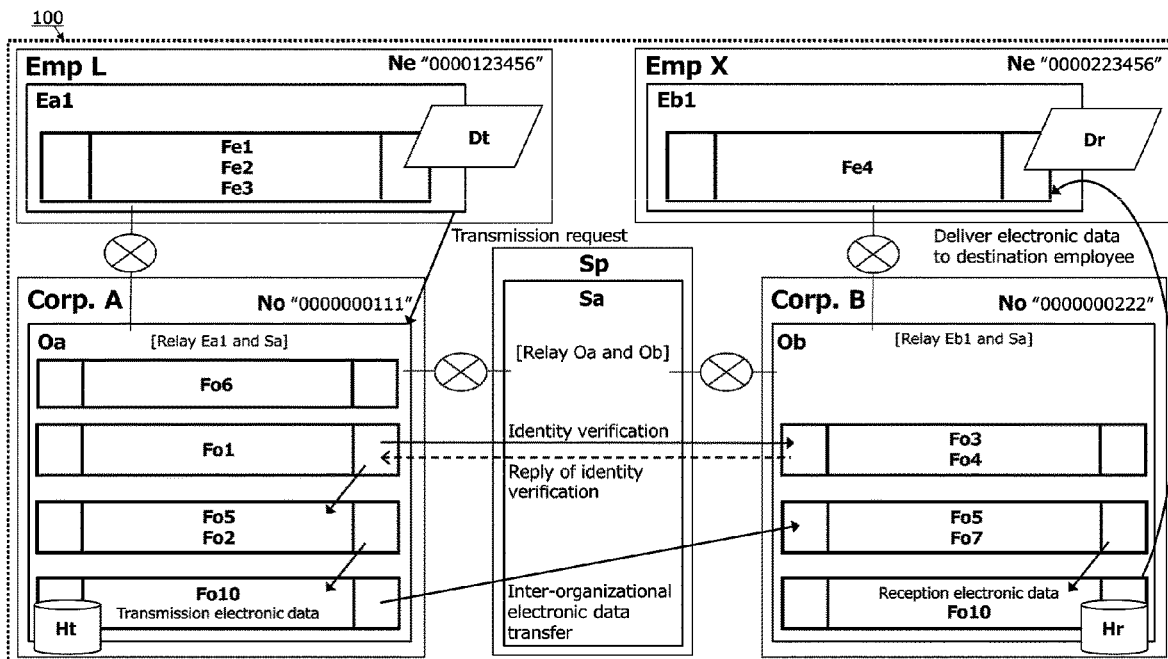
FIG. 2 is a diagram illustrating the overview of the electronic data transmission/reception method according to the above embodiment.
Figure 3:
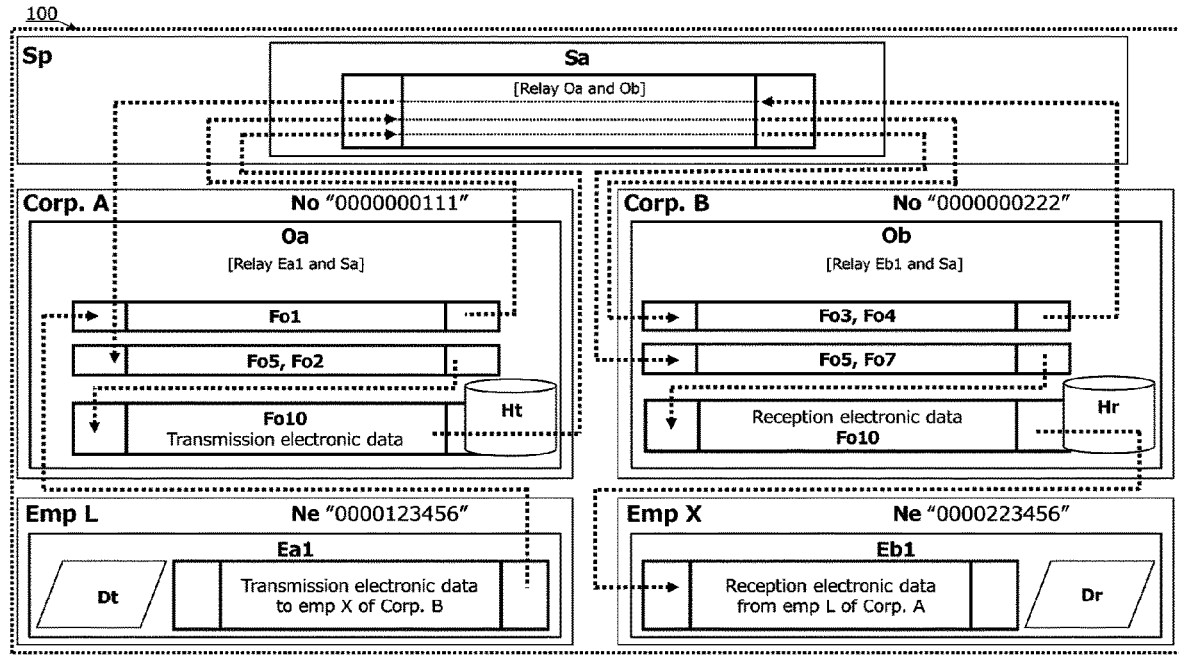
FIG. 3 is another diagram illustrating the overview of the electronic data transmission/reception method according to the above embodiment.

FIG. 1 to FIG. 3 are diagrams illustrating an overview of an electronic data transmission/reception control method 100 according to an embodiment of the present invention.

FIG. 1 illustrates that a service provider Sp is an enterprise providing a highly reliable and confidential electronic data transmission/reception service through an employee app, an organization app, and a service app that are used in the embodiment, and that an organization app and an employee app are used in the corporation A and the corporation B that use the service of transmitting/receiving the electronic data.

In addition, FIG. 1 illustrates that, in the present embodiment, there is one organization app and one or more employee apps per organization (per company). For example, it is assumed that a plurality of the employee apps, such as Ea1, Ea2, Ea3 . . . , are used in the corporation A.

It is to be noted that each app or function is described below in detail.

(App)

In the present embodiment, an "app" stands for application software, i.e., a dedicated program for a specific purpose developed to operate on the basic software (operating system) of computers such as mainframes, personal computers, tablets, or smartphones or on cloud computing, the program executing the above-mentioned steps independently or in cooperation with other applications and implementing functionality. The service provider Sp supplies, to users, an environment in which functions necessary for performing highly reliable and confidential electronic data transmission/reception, which is the object of the present invention, can be implemented and thereby provides services.

FIG. 2 and FIG. 3 illustrate transmission/reception of the electronic data in which a source is an employee L belonging to (enrolled in) the corporation A and a destination is an employee X belonging to (enrolled in) the corporation B. In addition, FIG. 2 and FIG. 3 illustrate that the employee app (the employee app Ea1 for the source employee L and the employee app Eb1 for the destination employee X), the organization app (an organization app Oa for the corporation A to which the source employee L belongs and an organization app Ob for the corporation B to which the destination employee X belongs), and the service app Sa are operating in cooperation via a network.

(Service App)

In addition, the electronic data transmission/reception control method of the present embodiment is configured such that when the electronic data is transmitted or received across the organizations such as the corporation A and the corporation B, not only the electronic data to be transmitted/received but also various information to be exchanged across the organizations, such as identity verification and identification verification reply, go through the service app.

In the present embodiment, a configuration is described in which the entity of the electronic data itself is distributed between apps. However, it is to be noted that, for the purpose of suppressing an increase in network traffic, a configuration can be appropriately selected in which the entity of the electronic data is stored in a neutral and secure storage, and reference information (link information) to the electronic data is distributed between apps.

(Acquisition of Organization App and Employee App)

Figure 4:
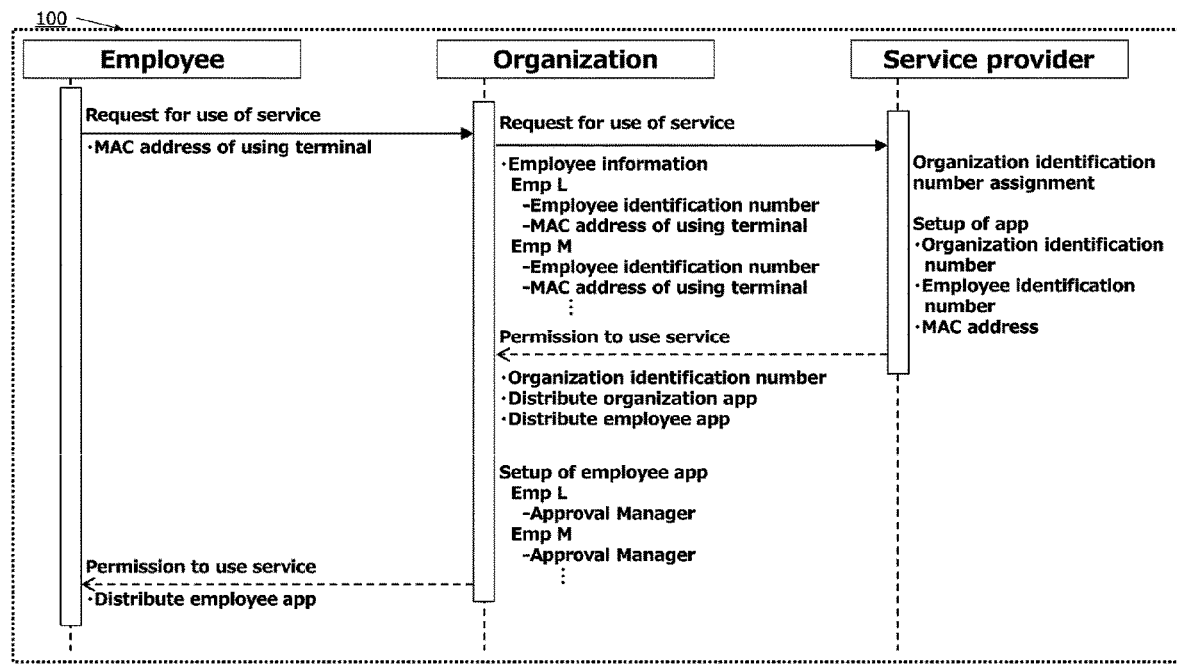
FIG. 4 is a diagram illustrating a flow up to the start of use of a service related to control of electronic data transmission/reception according to the above embodiment.

FIG. 4 is a diagram illustrating a procedure from request for use to start of use of the service for transmission/reception of the electronic data according to the present embodiment. First, the corporation A that wishes to use the electronic data transmission/reception control service according to the present embodiment pairs an employee identification number that is assigned uniquely to an employee who uses the service and a MAC address that is an identification number unique to an information terminal used by each employee, and makes a request to the service provider for use of the service.

Next, the service provider assigns an organization identification number, which is an identification number unique to the corporation A, and sets up and supplies, to the corporation A, one organization app representative of the corporation A and an employee app for each employee who has made a request for use (and for an information terminal associated with each employee).

the corporation A sets a person responsible for carrying out approval process of each employee for the organization app supplied from the service provider and supplies the employee app to each employee.

This places the organization app and the employee app in an identifiable state (see FIG. 1 and FIG. 2).

And, use of the supplied organization app and employee app makes it possible to use the service.

When using the service, it is possible to use functions only while the organization app is linked with the service app and the employee app is linked with the organization app.

Note that in the present embodiment, although it is assumed that a procedure via a network is used in a method of requesting use of the service or means to supply each app, known supply means can be appropriately selected.

(Employee App that is Source)

Figure 5:
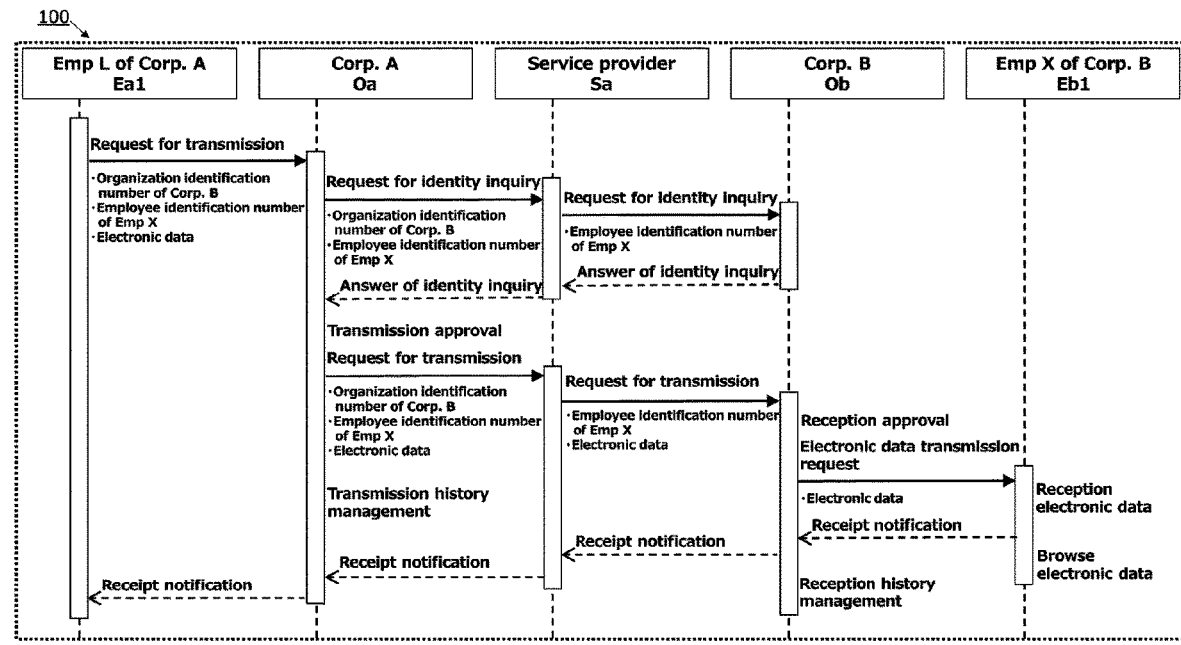
FIG. 5 is a diagram illustrating a flow of procedure related to electronic data transmission/reception and a flow of receipt notification according to the above embodiment.

As illustrated in FIG. 2 and FIG. 5, in the transmission/reception of the electronic data in which the employee L belonging to the corporation A is the source and the employee x belonging to the corporation B is the destination, when the employee L specifies the destination with the employee app Ea1, a document number assignment function Fe1 assigns a document number unique to the electronic data based on the following (document number assignment step): (1) an organization identification number of the corporation B to which the destination employee x belongs; (2) an employee identification number of the destination employee x; (3) the organization identification number of the corporation A to which the source employee L belongs; (4) an employee identification number of the source employee L; and (5) date and time when the transmission request has been made, which is described below. Here, (3) and (4) are internally held in the employee app Ea1. Then, an encryption function Fe2 encrypts the electronic data to be transmitted, using the assigned document number (encryption step).

Here, for the encryption of the electronic data by the employee app Ea1, such a function is implemented that, when the source employee L specifies (1) the organization identification number of the corporation B to which the destination employee x belongs and (2) the employee identification number of the destination employee x, the terminal in which the employee app Ea1 automatically detects the remaining (3), (4), and (5).

Figure 6:
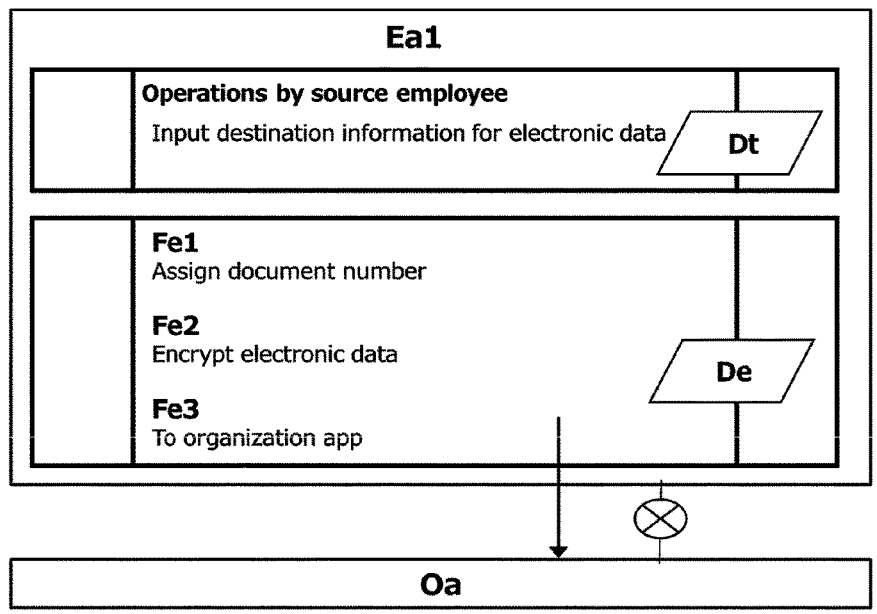
FIG. 6 is a diagram illustrating a transmission request procedure according to the above embodiment.

Then, with a transmission request function Fe3, the employee L requests the organization app Oa of the corporation A to which the employee L belongs to transmit the electronic data (transmission request step) (see FIG. 6).

In the present embodiment, specifying a destination refers to the source employee L specifying the destination by entering, in the employee app Ea1, the employee identification number of the employee x and the organization identification number of the corporation B information which are disclosed in advance from the destination employee x of the electronic data. Requesting transmission refers to pressing a request transmission button after the employee L specifies the destination with the employee app Ea1. However, the approach (user interface) therefor is not specifically limited and can be appropriately selected.

(Organization App when Belonging Employee is Source)

Next, when the transmission request for the electronic data is made on the employee app Ea1 of the employee L, the organization app Oa uses an identity verification function Fo1 to verify, with the organization app Ob of the corporation B to which the destination employee x belongs, via the service app Sa, whether or not the destination employee x is enrolled (identity verification step).

Then, with a transmission approval function Fo2, a responsible person of the corporation A confirms contents of the electronic data to be transmitted by the employee L and determines whether or not the transmission is allowed (transmission approval step).

Here, the organization app according to the present embodiment includes an identity inquiry function Fo3 to verify, when linked with the employee app via the network, that an employee who is eligible to use the employee app is an employee who belongs to the own organization on the basis of an employee identification number assigned to the employee. As described above, when the transmission/reception of the electronic data is performed in which the employee L belonging to the corporation A is the source and the employee x belonging to the corporation B is the destination, in response to the identity verification for the destination employee x by the organization app Oa of the corporation A, the organization app Ob of the corporation B uses an identity verification reply function Fo4 to give an identity verification reply on whether or not the employee x is the belonging employee (to the corporation B) on the basis of information acquired by the identity inquiry function Fo3 (identity verification reply step).

In the transmission approval step described above, the organization app Oa of the corporation A according to the present embodiment determines, under the responsibility of the corporation A, whether or not the electronic data requested for transmission is allowed to be transmitted to the employee x who belongs to the corporation B. Here, the electronic data which the employee L of the corporation A requests for transmission with the employee app Ea1 is encrypted using a document number and delivered to the organization app Oa of the corporation A. The organization app Oa sends an approval request to the responsible person who determines whether or not the transmission is allowed. The responsible person uses the organization app Oa to determine whether to accept or reject (see FIG. 7).

At this time, the responsible person uses a temporary browsing function Fo5 of the organization app Oa to temporarily decrypt the encrypted electronic data and temporarily make it browsable in order to confirm the contents of the electronic data that is necessary for the determination on approval (temporary browsing step).

In this transmission approval step, the computer in which the organization app Oa is installed implements a function to flexibly add or change approval routes so that the responsible person can ask a person having higher job responsibility to make the determination on approval.

In this manner, a transmission procedure for the transmission request made by the employee app Ea1 of the employee L does not continue unless not only the identity verification by the organization app Oa of the corporation A is performed and the identity verification reply is received from the organization app Ob of the corporation B that the destination employee x certainly belongs to the corporation B, but also the contents of the electronic data is confirmed by the responsible person of the corporation A and then the transmission approval is received.

Furthermore, when the employee L who belongs to the corporation A makes the transmission request on the employee app Ea1, the organization app Oa according to the present embodiment uses an identity guarantee function Fo6 to communicate and link with the employee app Ea1 via the network and compare an employee-unique identification number assigned in advance by the corporation A with a MAC address of the terminal used by the employee, thereby verifying that the source employee L is not a spoofer and guaranteeing his/her identity (identity guarantee step). Therefore, it is possible to ensure transmission/reception of secure electronic data that is free from any fraud such as spoofing of a source as well as a destination.

(Organization App when Belonging Employee is Destination)

When the source employee L of the electronic data executes the document number assignment step and the encryption step of the electronic data on the employee app Ea1 and makes the transmission request to the organization app Oa of the corporation A, the organization app Oa of the corporation A executes the identity verification step via the service app Sa. Here, since the document number is reversible, the service app Sa specifies the organization identification number of the corporation B which is the destination on the basis of the information used during the assignment of the document number, and relays the request to the organization app Ob of the corporation B Similarly, the organization app Ob of the corporation B specifies the employee identification number of the destination employee x on the basis of the document number and executes the identity verification step.

Then, the organization app Ob of the corporation B according to the present embodiment is requested to verify the identity via the service app Sa. At this time, the employee identification number of the employee x identified by the organization app Oa of the corporation A from the document number assigned to the electronic data is compared with the employee identification number of the employee x which is held by the identity inquiry function of the organization app Ob as described above.

Then, the identity verification reply function Fo4 replies a result of checking of the employee identification number of the employee x to the organization app Oa of the corporation A via the service app Sa (identity verification reply step).

Figure 7:
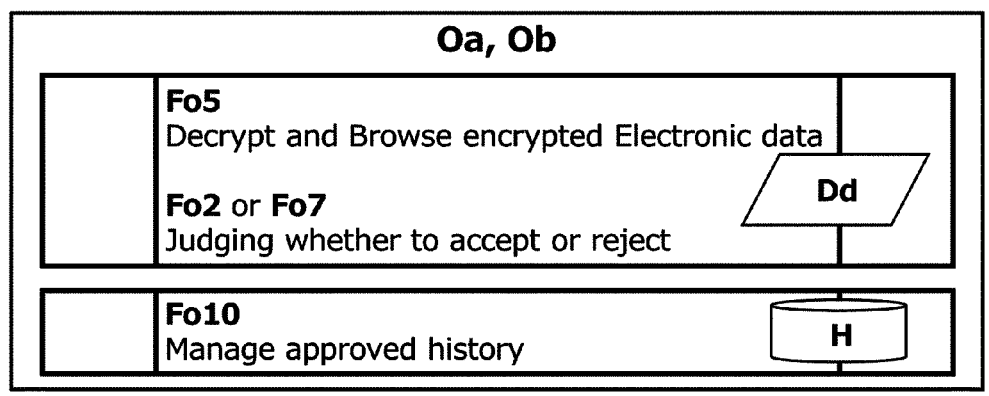
FIG. 7 is a diagram illustrating a transmission approval procedure and a reception approval procedure according to the above embodiment.

Next, the organization app Ob of the corporation B according to the present embodiment determines, under the responsibility of the corporation B, whether or not the reception of the electronic data by the employee x who belongs to the corporation B is allowed (see FIG. 7).

The organization app Ob of the corporation B receives, via the service app Sa, the electronic data which is approved for transmission by the organization app Oa of the corporation A to which the source employee L belongs.

The organization app Ob of the corporation B uses a reception approval function Fo7 to notify the responsible person, who determines whether or not the reception of the received electronic data is allowed, of the approval request, and the responsible person uses the organization app Ob to determine whether to accept or reject (reception approval step).

At this time, the responsible person uses the temporary browsing function Fo5 of the organization app Ob to temporarily decrypt the encrypted data and temporarily make it browsable in order to confirm the contents of the electronic data that is necessary for the determination on approval (temporary browsing step).

In this reception approval step, the organization app Ob can flexibly add or change approval routes so that the responsible person can ask a person having higher job responsibility to make the determination on approval.

(Employee App that is Destination)

When the organization app Ob of the corporation B approves the reception of the electronic data, the employee app Eb1 for the destination employee x receives the electronic data.

Figure 8:
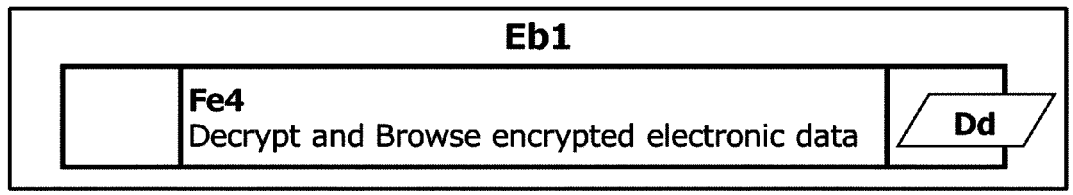
FIG. 8 is a diagram illustrating browsing of received electronic data according to the above embodiment.

And, the browsing function Fe4 that the employee app Eb1 includes decrypts and visualizes the encrypted and transmitted electronic data in order to make it browsable (browsing step) (see FIG. 8).

In this manner, when the source employee L of the corporation A transfers the electronic data to the destination employee x of the corporation B, the transmission approval is performed under the responsibility of the corporation A, and the reception approval is performed under the responsibility of the corporation B. This clarifies where the responsibility lies when there is a problem on the transmission/reception of the electronic data or the contents of the transmitted/received electronic data, and contributes to realization of highly reliable electronic data transmission/reception.

(History Management of Organization App)

Figure 9:
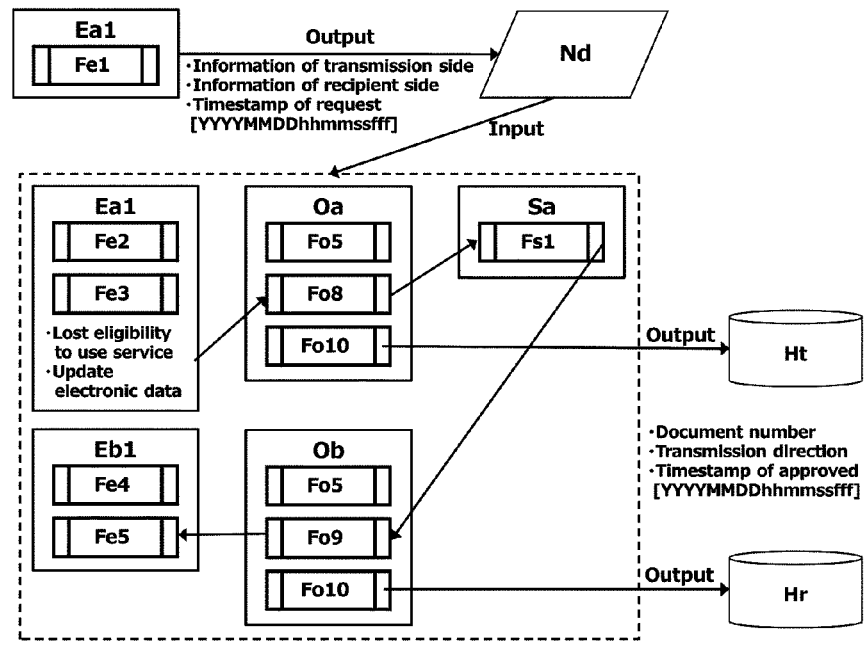
FIG. 9 is a diagram illustrating history management according to the above embodiment.

The transfer of the electronic data from the source employee L who belongs to the corporation A to the destination employee x who belongs to the corporation B has been described above. However, when the employee app Ea1 of the source employee makes the transmission request, the computer in which the organization app according to the present embodiment is installed implements a function to manage subsequent actions related to the electronic data as a history on the basis of document numbers assigned to the electronic data to be transmitted (see FIG. 9).

In the present embodiment, the organization app Oa of the corporation A to which the source employee L belongs and the organization app Ob of the corporation B to which the destination employee x belongs manage the history of the electronic data when the transmission/reception approval of the electronic data has been completed (history management function Fo10).

Here, the document number unique to the electronic data assigned by the document number assignment function Fe1 of the employee app for the source employee L is used to manage the history. Specifically, the document number is assigned based on (1) the organization identification number of the corporation B to which the destination employee x belongs; (2) the employee identification number of the destination employee x; (3) the organization identification number of the corporation A to which the source employee L belongs; (4) the employee identification number of the source employee L; and (5) the date and time when the transmission request is made (see FIG. 9). Here, (3) and (4) are internally held in the employee app Ea1.

Therefore, the document numbers of the electronic data are individually identifiable so that the history can be controlled. Thus, in the case where there is a problem with transmission/reception of the electronic data, processing involved in loss of the eligibility to use the employee app due to the separation from job of the employee is necessary, or the like, the history related to the electronic data in question can be retroactively extracted.

In addition, because the document numbers of the electronic data are individually identifiable, there is no need to store the electronic data itself as the history in the organization app, which contributes to improvement of confidentiality as well as prevention of expansion of accumulated data.

In the present embodiment, the document numbers of the electronic data to be used in the history management are assigned based on the above-mentioned elements of (1) to (5). However, other elements such as a title of the electronic data ("Contract", "Specifications", or "Estimates") may be incorporated, and contents of these elements can be selected appropriately.

(Procedure when Employee Loses Eligibility to Use Service)

Figure 10:
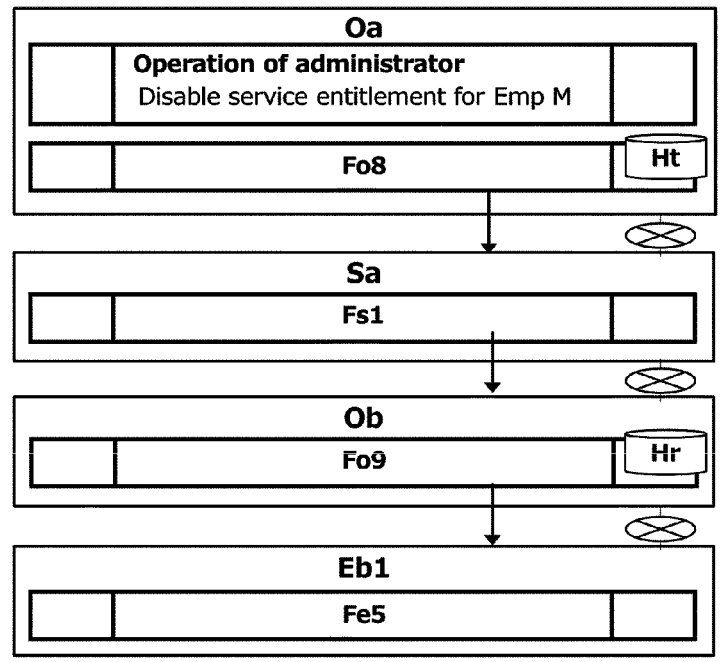
FIG. 10 is a diagram illustrating a procedure when eligibility to use an employee app is lost according to the above embodiment.

Now, a procedure when an employee who belongs to an organization that uses the electronic data transmission/reception service according to the present embodiment has lost the eligibility to use the employee app Ea1 due to the separation from job or the like will be described with reference to FIG. 10.

In addition, with reference to FIG. 1, an employee who has left the organization is an employee M, the organization to which the employee M belongs is the corporation A, an employee to whom the employee who has left the job transmitted the electronic data is an employee Y, and an organization to which the employee Y belongs is the corporation B.

First, the corporation A disables the function of the employee app Ea2 for the employee M who has left the job. As a result, the electronic data received so far by the employee app Ea2 used by the employee M is deleted.

The organization app Oa includes a deletion request function Fo8 to extract the electronic data transmitted by the employee M in the past from the managed history, and to request the service app Sa to delete this electronic data. Then, the organization app Oa uses a deletion instruction function Fs1 included in the service app Sa that received the deletion request in order to specify the corporation B that is the destination of the deletion request and instruct the organization app Ob to delete the electronic data in question (deletion instruction step).

At this time, the service Sa compares the organization identification of the destination, which is an element of the document number of the electronic data for which the deletion request was made, with the organization identification number held in the service app Sa, and transmits a telegram message of the deletion instruction to the organization app for the organization.

Then, the organization app Ob of the corporation B that receives the deletion instruction transmitted from the service app Sa specifies the employee Y who received the electronic data targeted for the deletion instruction, and uses a deletion order function Fo9 to order the employee app Eb2 to delete the targeted electronic data (deletion order step).

At this time, the organization app Ob compares an employee identification number of the destination employee Y, which is the element of the document number of the electronic data targeted for the deletion order, with the employee identification number of the employee Y held in the service app Sa, and creates a telegram message of the deletion order.

Then, the employee app Eb2 includes a deletion function Fe5 to delete the target electronic data upon receipt of the deletion order next time when linked with the organization app Ob, and the electronic data is deleted from the employee app Eb2.

This makes it difficult for an employee who leaves job to maliciously take out transmitted/received data or take over the electronic data from a recipient whom the employee transmitted the electronic data in the past, which allows for secure and confidential electronic data control.

In addition, when the electronic data transmitted/received in the past has become obsolete due to elapse of time, corrections/updates of contents, or the like, deletion is possible not only from the organization app but also from the employee app.

If the transmitted electronic data becomes obsolete due to the corrections or updates of the contents, the employee L who was the source in the past uses the employee app Ea1 in order to select the electronic data and make the deletion request.

At this time, the employee L uses the employee app Ea1 to select the document number of the electronic data to be deleted and make the deletion request, the document number being assigned when making the transmission request. Thereafter, as described above: the organization app Oa receives the deletion request and requests the service app Sa to delete the electronic data on the basis of the document number of the electronic data to be deleted; the service app Sa receives the deletion request and sends the deletion instruction to the organization app Ob that manages the history related to the electronic data; the organization app Ob which receives the deletion instruction communicates and links with the employee app Eb1 of the destination employee x of the electronic data and makes the deletion order; and the employee app Eb1 completes the deletion.

Such an approach also makes it possible to make the deletion request not only from the source employee L of the electronic data to be deleted but also from the destination employee x.

(Mutual Simultaneous Transmission of Electronic Data Such as Business Card Exchange)

Now, a case in which the employee L belonging to the corporation A and the employee x belonging to the corporation B, who use the electronic transmission/reception control according to the present embodiment, exchange business cards (data) will be described.

In order for two parties to mutually and simultaneously transmit/receive electronic data such as exchanging business cards, the computer in which (the document number assignment function Fe1 of) the employee app is installed implements a function to specify a destination of the electronic data and to select whether the transmission of the electronic data is unidirectional electronic data transmission as described above, or bidirectional electronic data transmission such as the exchanging business cards.

When specifying the destination of the electronic data, the employee L who exchanges business cards selects the bidirectional electronic data transmission with the destination employee x.

At this time, if the source employee L selects the bidirectional transmission for the electronic data Da in the employee app Ea1, information that the transmission is bidirectional is added to the document number of the electronic data Da (to be transmitted from the employee L).

Upon receipt of the transmission request, as with the unidirectional transmission, the organization app Oa executes the identity verification to the organization app Ob of the corporation B to which the destination employee x belongs, and receives the identity verification reply from the organization app Ob of the corporation B. With the temporary browsing function Fo5, the responsible person confirms the contents of the electronic data, and then, the transmission approval is performed.

When the service app Sa determines, on the basis of the document number, that the transmission of the electronic data Da is bidirectional, the service app Sa does not allow establishment of the transmission of the electronic data Da and keeps it pending until the transmission from the organization app Ob of the corporation B is approved by an approval confirmation synchronization function Fs2 (approval confirmation synchronization step).

On the other hand, similarly to the employee L, when transmitting the electronic data with the employee app Eb1, the employee x selects the bidirectional transmission of electronic data Db with the destination employee L and makes the transmission request.

In the organization app Ob of the corporation B as well, the transmission of the electronic data Db is approved through the steps similar to those of the unidirectional transmission. When the transmission approval of both the corporation A and the corporation B is obtained, the service app Sa establishes the mutual and simultaneous transmission of the electronic data Da and Db with the approval confirmation synchronization function Fs2.

Figure 11:
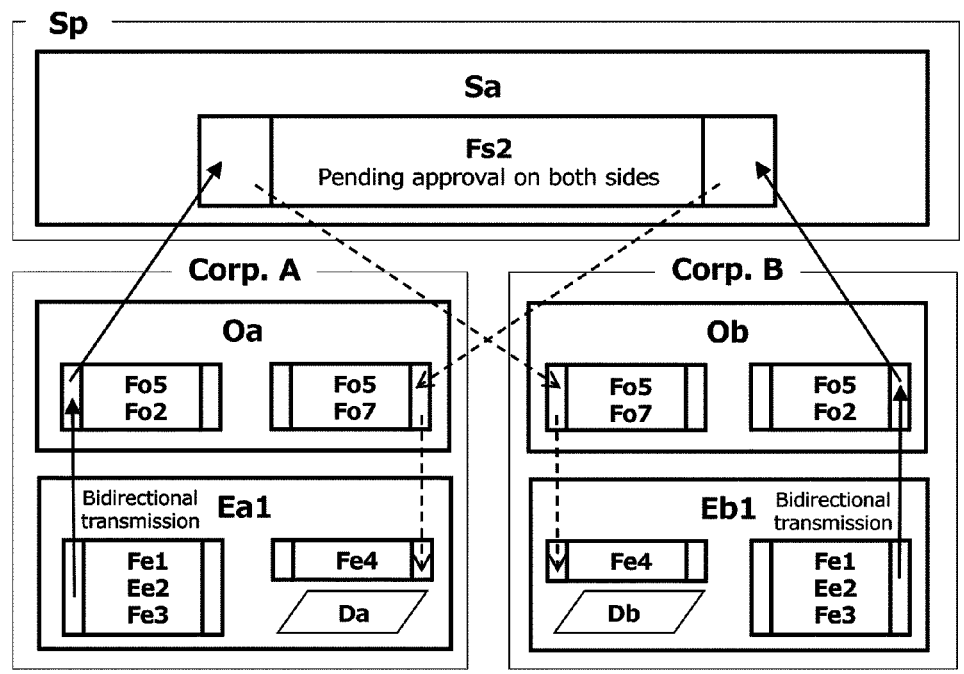
FIG. 11 is a diagram illustrating an overview of simultaneous and bidirectional transmission/reception of electronic data according to the above embodiment.

In this manner, by using the electronic data transmission/reception control method or system according to the present embodiment, not only unidirectional electronic data transmission/reception but also mutual, simultaneous, and equal transmission/reception of electronic data approved by belonging organizations become possible even when working remotely amidst the tendency of shifting some of business decisions which were traditionally led by the organizations to the discretion of employees due to the recent changes in work styles (see FIG. 11).

In the present embodiment, description has been given assuming that the organizations that perform electronic data transmission/reception are the corporation A and the corporation B. However, it is to be noted that the "organizations" in the present invention may be replaced with "divisions" in companies, and the electronic data transmission/reception between two parties such as the corporation A and the corporation B may be extended to those among three or more organizations. Therefore, the present invention makes it possible to implement reliable and highly confidential electronic data transmission/reception in various situations.

DESCRIPTION OF REFERENCE NUMERALS

100 Electronic data transmission/reception control method
D, Da, Db, Dt, Dr, De, Dd Electronic data
E, Ea1, Ea2, Ea3, Eb1, Eb2, Eb3 Employee app
H, Ht, Hr History
Fe1 Document number assignment function
Fe2 Encryption function
Fe3 Transmission request function
Fe4 Browsing function
Fe5 Deletion function
Fs1 Deletion instruction function
Fs2 Approval confirmation synchronization function
Fo1 Identity verification function
Fo2 Transmission approval function
Fo3 Identity inquiry function
Fo4 Identity verification reply function
Fo5 Temporary browsing function
Fo6 Identity guarantee function
Fo7 Reception approval function
Fo8 Deletion request function
Fo9 Deletion order function
Fo10 History control function
L, M, N, X, Y, Z Employee
Sa Service app
Sp Service provider
O, Oa, Ob Organization app
A, B Corporation
Ne Employee identification number
No Organization identification number
Nd Document number

The invention claimed is:

1. An electronic data transmission/reception control method, wherein electronic data is transferred, via a network, from a first terminal in which an employee application (which is hereinafter referred to as an app) used by employees who belong to a predetermined source organization of electronic data is installed, through a first computer in which an organization app of the source organization of the electronic data is installed, a second computer in which a service app is installed, and a third computer in which the organization app of a destination organization of the electronic data is installed, to a second terminal in which the employee app used by employees who belong to the destination organization of the electronic data is installed, wherein, the first terminal is configured to execute, as a source of the electronic data:

a document number assignment step for assigning, to the electronic data to be transmitted, a reversible unique document number, a document number containing identification information of both the source and destination organizations and the employees, the identification information at both the source organization and the destination organization being extractable from the information used when the document number is assigned;
an encryption step for encrypting the electronic data to be transmitted using the document number; and
a transmission request step for requesting the first computer used by a responsible person of the source organization to transmit the electronic data, handing over the document number together with the encrypted electronic data, and the second terminal is configured to execute, as a destination of the electronic data,
a browsing step for decrypting and visualizing the received electronic data using the document number;

the first computer is configured to execute, as the source of the electronic data, in response to a receipt of a transmission request for the electronic data from the first terminal prior to transmitting the electronic data to the third computer:
an identity verification step for verifying identity of the destination employee, including whether or not the destination employee is enrolled, via the second computer to the third computer by notifying an identity verification request together with the document number; and
a transmission approval step for determining whether or not the transmission is allowed is notified of an approval request in response to a determination of a responsible person of the source organization using the organization app installed on the first computer, and the third computer is further configured to execute, as a destination of the electronic data transmitted from the first computer,
an identity inquiry step for, in response to a receipt of the identity verification from the first computer, identifying the destination employee from the document number and checking whether or not the destination employee is enrolled by matching with the employee identification number assigned in advance by the third computer, and
a receipt approval step in which, in response to a receipt of the electronic data from the first computer via the second computer, for determining whether or not the receipt is allowed is notified of an approval request in response to a determination of a responsible person of the destination organization using the organization app installed on the third computer.

2. The electronic data transmission/reception control method according to claim 1, wherein, when a transmission request is made on the first terminal used by the employee of the source organization, the first computer is configured to execute an identity guarantee step for, in cooperation via the network with the first terminal, comparing an employee identification number assigned in advance by the source organization with a MAC address of the first terminal is not a spoofer and guarantee his/her identity.

3. The electronic data transmission/reception control method according to claim 1, wherein the first computer is configured to execute a temporary browsing step for temporarily decrypting and visualizing the electronic data encrypted by the first terminal and making it possible to browse the electronic data in order to approve transmission and reception.

4. The electronic data transmission/reception control method according to claim 1, wherein the first computer is configured to execute a history management step for recording and managing a transmission history and a reception history when the electronic data is transmitted or received on the basis of the document number created by the first terminal.

5. The electronic data transmission/reception control method according to claim 1, wherein the first computer is configured to execute an identity guarantee step for making inquiries about the employee identification number assigned in advance by the source organization and the MAC address of the first terminal or the second terminal to check that the employee is the person in question, when the first or second terminal is linked via the network.

6. The electronic data transmission/reception control method according to claim 4, wherein:
when an employee who belongs to the source organization has lost eligibility to use service of the employee app due to separation from job or the like, the first computer is configured to execute a deletion request step for disabling the employee app for the employee, extracting transmissions carried out by the employee in the past from the transmission history, and requesting, via the second computer, the third computer of the destination organization to delete the electronic data;
upon receipt of the deletion instruction, the third computer is configured to execute a deletion order step for specifying the employee who orders the deletion and ordering the deletion; and
upon receipt of the deletion order, the second terminal is configured to execute a deletion step for deleting the electronic data in response to the deletion order next time when linked with the third computer.

7. An electronic data transmission/reception control system, wherein electronic data is transferred, via a network, from a first terminal in which an employee application (which is hereinafter referred to as an app) used by employees who belong to a predetermined source organization of electronic data is installed, through a first computer in which an organization app of the source organization of the electronic data is installed, a second computer in which a service app is installed, and a third computer in which the organization app of a destination organization of the electronic data is installed, to a second terminal in which the employee app used by employees who belong to the destination organization of the electronic data is installed, wherein:
the first terminal is configured to implement, as a source of the electronic data:
a document number assignment function for assigning, to the electronic data to be transferred, a reversible unique document number, a document number containing identification information of both the source and destination organizations and the employees, the identification information at both the source organization and the destination organization being extractable from the information used when the document number is assigned;
an encryption function for encrypting the electronic data to be transmitted using the document number; and
a transmission request function for requesting the first computer used by a responsible person of the source organization to transmit the electronic data, handing over the document number together with the encrypted electronic data, and the second terminal is configured to implement, as a destination of the electronic data,
  a browsing function for decrypting and visualizing the received electronic data using the document number;
the first computer is configured to implement, as the source of the electronic data, in response to a receipt of a transmission request for the electronic data from the first terminal prior to transmitting the electronic data to the third computer:
  an identity verification function for verifying identity of the destination employee, including whether or not the destination employee is enrolled, via the second computer to the third computer by notifying an identity verification request together with the document number; and
  a transmission approval function for determining whether or not the transmission is allowed is notified of an approval request in response to a determination of a responsible person of the source organization using the organization app installed on the first computer, and
the third computer is further configured to implement, as a destination of the electronic data transmitted from the first computer,
  an identity inquiry function for, in response to a receipt of the identity verification from the first computer, identifying the destination employee from the document number and checking whether or not the destination employee is enrolled by matching with the employee identification number assigned in advance by the third computer, and
  a receipt approval function in which, in response to a receipt of the electronic data from the first computer via the second computer, for determining whether or not the receipt is allowed is notified of an approval request in response to a determination of a responsible person of the destination organization using the organization app installed on the third computer.

8. The electronic data transmission/reception control system according to claim 7, wherein, when a transmission request is made on the first terminal used by the employee of the source organization, the first computer is configured to implement an identity guarantee function for, in cooperation via the network with the first terminal, comparing an employee identification number assigned in advance by the source organization with a MAC address of the first terminal is not a spoofer and guarantee his/her identity.

9. The electronic data transmission/reception control system according to claim 7, wherein the first computer is configured to implement a temporary browsing function for temporarily decrypting and visualizing the electronic data encrypted by the first terminal and making it possible to browse the electronic data in order to approve transmission and reception.

10. The electronic data transmission/reception control system according to claim 7, wherein the first computer is configured to implement a history management function for recording and managing a transmission history and a reception history when the electronic data is transmitted or received on the basis of the document number created by the first terminal.

11. The electronic data transmission/reception control system according to claim 7, wherein the first computer is configured to implement an identity guarantee function for making inquiries about the employee identification number assigned in advance by the source organization and the MAC address of the first terminal or the second terminal to check that the employee is the person in question, when the first or second terminal is linked via the network.

12. The electronic data transmission/reception control system according to claim 10, wherein:
  when an employee who belongs to the source organization has lost eligibility to use service of the employee app due to separation from job or the like, the first computer is configured to implement a deletion request function for disabling the employee app for the employee, extracting transmissions carried out by the employee in the past from the transmission history, and requesting, via the second computer, the third computer of the destination organization to delete the electronic data;
  upon receipt of the deletion instruction, the third computer is configured to implement a deletion order function for specifying the employee who orders the deletion and ordering the deletion; and
  upon receipt of the deletion order, the second terminal is configured implement a deletion function for deleting the electronic data in response to the deletion order next time when linked with the third computer.

13. An electronic data transmission/reception control system, provided by an organization acting as a service provider for data transmission/reception service through an employee application (which is hereinafter referred to as an app), an organization app, and a service app, wherein electronic data is transferred, via a network,
  from a first terminal in which the employee app used by employees who belong to a predetermined source organization of electronic data is installed,
  through a first computer in which the organization app of the source organization of electronic data is installed, a second computer at the service provider in which the service app is installed, and a third computer in which the organization app of the destination organization of the electronic data is installed
  to a second terminal in which the employee app used by employees who belong to the destination organization of electronic data is installed, wherein:
  the employee app is previously supplied by the service provider to the first and second terminals to be installed, and the organization app is previously supplied by the service provider to the first and third computers to be installed,
  the employee app is configured to cause the first terminal to implement:
    the document number assignment function for assigning, to the electronic data to be transmitted, a reversible document number unique thereto, the document number containing identification information of both the source and destination organizations and employees so that information on both of the source and the destination is extractable from information used when the document number has been assigned;
  the organization app is configured to cause the first computer to implement,
    as a source of the electronic data, upon receipt of a transmission request for the electronic data from the first terminal: an identity verification function for verifying identity of the destination employee, i.e., whether or not the destination employee is enrolled, via the second computer to the third computer;
  the organization app is configured to cause the third computer to implement,
    as a destination of the electronic data, an identity inquiry function for, upon receipt of the identity verification from another organization, identifying the destination employee from the document number and checking whether or not the destination employee is enrolled by matching with the employee identification number assigned in advance in the own organization; and an identity verification reply function for replying, via the second computer, a result of the identity inquiry to the identity verification from the other organization;

the service app is configured to cause the second computer to implement:

a communication destination specifying function for extracting recipient information from the information contained in the document number and specifying a recipient organization; and a relay function for relaying identity verification requests from the first computer to the third computer, relaying identity verification replies from the third computer to the first computer, and relaying the encrypted electronic data between the first computer and the third computer.

14. The electronic data transmission/reception control system according to claim 13, wherein:

when an employee who belongs to an organization has lost eligibility to use service of the employee app due to separation from job or the like, the first computer implements a deletion request function for extracting transmissions carried out by the employee in the past from the transmission history, and requesting to the second computer, with a document number attached, to delete the electronic data;

upon receipt of the deletion request, the second computer is configured to implement a deletion instruction function for specifying, from the document number passed at the time of the deletion request, an organization that instructs the deletion and instructing the third computer for the organization to delete the electronic data.

15. The electronic data transmission/reception control system according to claim 13, wherein the service app is configured to cause the second computer to implement an approval confirmation and synchronization function that, in bidirectional transmission/reception where the first computer of each organization is the same as the third computer, when transmission/reception of electronic data is carried out assuming that employees of two organizations simultaneously perform the transmission/reception of the electronic data with respect to each other, such as exchange of business cards, the electronic data is transferred to both organizations only if the first computers of both organizations approve the transmission of the electronic data, and the transmission/reception is not established if either one of the first computers does not approve, wherein, in the bidirectional transmission/reception, the first computer of each organization is the same as the third computer.

* * * * *